UNITED STATES PATENT OFFICE.

BERTHA LEIBBRANDT, OF SANTA CRUZ, CALIFORNIA.

PROCESS OF MANUFACTURING BREAD FROM WHOLE GRAIN.

1,167,703.  Specification of Letters Patent.  Patented Jan. 11, 1916.

No Drawing.  Application filed January 2, 1915.  Serial No. 263.

*To all whom it may concern:*

Be it known that I, BERTHA LEIBBRANDT, a citizen of the United States, residing at Santa Cruz, in the county of Santa Cruz and State of California, have invented certain new and useful Improvements in Processes of Manufacturing Bread from Whole Grain, of which the following is a specification.

This invention relates to an improved process of manufacturing bread from whole grain, and has for its primary object to provide an improved process of this character whereby the necessity of grinding the grain into flour which is sometimes performed under unhygienic and unsanitary conditions, is avoided, and considerable economy consequently realized in the preparation of the grain, by the elimination of all waste.

The invention has for another object to provide an improved process for treating the whole grain, whereby the latent nutritive elements thereof are developed and the bread rendered uniform in consistency, easily digestible, and of excellent taste.

In carrying out my improved process for converting or manufacturing whole unground grain, such as wheat or rye, into bread, cakes and the like, the whole grain is first thoroughly washed in flowing or running water. This initial step is of primary importance because large quantities of dirt, dust, small hairs, and bacilli adhere to the particles of grain.

After washing the whole grain in this manner, the same is placed in a steeping vat where it is allowed to steep in warm water. In this manner germination of the grain is caused, so that the germ starts to develop and a transformation and disintegration of the nutritious constituents takes place which hitherto had not been affected. When moisture and heat are thus admitted to the grain, the action is, in the first place, mechanical, swelling the grain, and secondly, there is a chemical action affecting the outer part of the starch nucleus and softening the layer of gluten grown into the episperm. The gluten unites with the softened parts of the starch and brings about fermentation, or the so-called diastase. This latter possesses the power of changing the immense quantity of starch present in the dough in the preliminary stage of the sugar, into dextrin. The soluble ferments arising in the germinating seed act upon the starch and gluten by breaking these constituents up or disintegrating the same. The chemical function of the ferments, so important for the physiology of nutrition, increases the food supply of the germ, and when the whole grain is crushed into dough, elements of nutrition are, therefore, added, which would otherwise be lost, owing to the fact that the same would not be disintegrated. It is, consequently, evident that the absorbed water does not remain in the form of water; but that the excess supply having entered the body of the grain in a chemically pure state and taken part in the organic growth thereof, has disintegrated the grain substances which are lost with the bran in the usual process of grinding dry grain. In this preparatory step of the process, only the first stage of the decomposition is reached. The nutritive elements of the grain can be more easily disintegrated by the gastric juice, while all loss or waste is eliminated. This process of softening the whole grain is, therefore, to be considered as the most important of the entire invention. After this steeping process is finished, the moist grain is crushed in a dough mill, so that the grain is converted into dough. This dough is set aside for the necessary time, in a moderate heat to permit of the chemical action of the yeast inherent therein so that the dough will expand or rise in the usual manner. I, thus, eliminate the necessity of employing chemical baking powders and the like. The body of dough is then formed into loaves or cakes of suitable size and form, and baked in a moderately heated oven. This baking should, preferably, consume about twelve hours. Owing to this slow baking of the dough in a mild heat, the disintegration process that helps to render the bread easily digestible, can re-act much more intensively than during a short and high heat.

It is to be particularly noted that there is no griding or bolting of the grain and the crushed grain left in a moderate heat, will rise through the action of its own yeast. The procedure must, therefore, be carefully watched to obviate killing of the leaven which is in the germ of the wheat grain. I preferably use only one grade of wheat, and that, the best.

I have found in practice, that bread produced from dough in which the whole grain, treated in the manner above set forth, is embodied, is very palatable, easily digestible, and of the highest nutritive value. Attention might also be directed to the fact that, in the ordinary preparation of bread dough, 100 pounds of the whole grains converted into flour will produce only 100 pounds of bread. With my improved process, however, 100 pounds of whole grain will produce 150 pounds of whole wheat or rye bread. Thus, considerable economy may be realized in the use of my improved process.

Having thus fully described my invention, what I desire to claim and secure by Letters Patent is:—

1. The herein described process for manufacturing bread which consists in placing the whole grain in a steeping vat and subjecting the same to the action of warm water to cause germination, then crushing the moist grain and converting the same into dough, then permitting the dough to rise through the action of the yeast inherent therein and finally forming the dough into loaves and baking the same in a moderate heat and for a comparatively long time.

2. The herein described process for manufacturing bread from whole grain which consists in first thoroughly washing the whole grain in running water, secondly, placing the grain in a steeping vat and subjecting the same to warm water whereby the grain is caused to germinate and the nutritive constituents thereof are developed, thirdly, crushing the moist grain and permitting the same to rise or expand through the action of the yeast inherent therein, and lastly, forming the dough into loaves and baking the same in an oven at a low heat for approximately twelve hours.

In testimony whereof I hereunto affix my signature in the presence of two witnesses.

BERTHA LEIBBRANDT.

Witnesses:
AGNES H. BOSTON,
LLOYD BOWMAN.